US010419601B2

(12) United States Patent
Katai et al.

(10) Patent No.: US 10,419,601 B2
(45) Date of Patent: Sep. 17, 2019

(54) METHODS AND SYSTEMS FOR MANAGING MULTIPLE COMMUNICATION SESSIONS FROM A SINGLE ON-SCREEN USER INTERFACE

(71) Applicant: Verizon Patent and Licensing Inc., Arlington, VA (US)

(72) Inventors: Lonnie Katai, Murphy, TX (US); Kristopher T. Frazier, McKinney, TX (US); Michael J. D'Argenio, Green Brook, NJ (US); Zachariah Eamon Nelson, Elizabeth, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 653 days.

(21) Appl. No.: 14/980,397

(22) Filed: Dec. 28, 2015

(65) Prior Publication Data

US 2017/0187868 A1   Jun. 29, 2017

(51) Int. Cl.
| | | |
|---|---|---|
| *G06F 3/00* | (2006.01) | |
| *G06F 9/00* | (2006.01) | |
| *G06F 17/00* | (2019.01) | |
| *H04M 1/725* | (2006.01) | |
| *H04L 29/06* | (2006.01) | |
| *G06F 3/0481* | (2013.01) | |
| *G06F 3/0488* | (2013.01) | |
| *G06F 3/0486* | (2013.01) | |
| *H04M 1/57* | (2006.01) | |

(52) U.S. Cl.
CPC ...... *H04M 1/72583* (2013.01); *G06F 3/0486* (2013.01); *G06F 3/0488* (2013.01); *G06F 3/04817* (2013.01); *H04L 65/1089* (2013.01); *H04M 1/72519* (2013.01); *H04M 1/72547* (2013.01); *H04M 1/576* (2013.01); *H04M 2250/22* (2013.01); *H04M 2250/62* (2013.01)

(58) Field of Classification Search
CPC .. G06F 3/0488; G06F 3/04817; G06F 3/0486; H04M 1/72583; H04M 1/72547; H04M 1/72519; H04M 2250/22; H04M 2250/62; H04L 65/1089; H04L 1/576
See application file for complete search history.

(56) References Cited

U.S. PATENT DOCUMENTS

| | | | | |
|---|---|---|---|---|
| 2002/0075305 | A1* | 6/2002 | Beaton | G06Q 10/107 715/751 |
| 2010/0171807 | A1* | 7/2010 | Tysso | H04N 7/147 348/14.09 |
| 2010/0246571 | A1* | 9/2010 | Geppert | G06F 3/04817 370/352 |

(Continued)

*Primary Examiner* — Kieu D Vu
*Assistant Examiner* — Anita D. Chaudhuri

(57) ABSTRACT

An exemplary communication session management system concurrently presents a plurality of session icons within a single on-screen user interface, each session icon representative of a respective communication session and configured to visually indicate a session status of the respective communication session. The communication session management system further detects a user action performed by a user with respect to one of the plurality of session icons, modifies a communication session in response to the user action, and graphically indicates the modification of the session status of the communication session. Corresponding systems and methods are also described.

20 Claims, 13 Drawing Sheets

(56) References Cited

U.S. PATENT DOCUMENTS

2013/0109425 A1* 5/2013 Kerger ................ H04L 65/4061
 455/518
2015/0295777 A1* 10/2015 Cholkar .............. G06F 3/04842
 715/753

* cited by examiner

METHODS AND SYSTEMS FOR MANAGING MULTIPLE COMMUNICATION SESSIONS FROM A SINGLE ON-SCREEN USER INTERFACE

BACKGROUND INFORMATION

In recent years, electronics and communication technology advancements have combined to offer business and consumer users an unprecedented choice of communication capabilities and features. For example, a communication service provider may offer users an ability to conduct multiple communication sessions (e.g., phone calls, messaging exchanges, etc.) concurrently using just one communication device. Unfortunately, conducting concurrent communication sessions can be confusing and/or difficult for users, making them less likely to use the capabilities offered by the communication service provider. In particular, switching between an active and a non-active communication session, merging communication sessions into a group session, and changing the type of communication session (e.g., from a voice call to a video call), each may require the user to perform one or more user actions with respect to one or more user interfaces presented by a communication device. Because the user actions may be unintuitive (e.g., requiring user actions unfamiliar to the user), overly cumbersome (e.g., requiring more steps and/or disparate interfaces than necessary), and/or unpredictable (e.g., requiring users to perform steps the user worries may have unintended effects such as terminating a communication session), users may be discouraged from taking advantage of features that would otherwise be useful to them.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Methods and systems for managing multiple communication sessions from a single on-screen user interface are described herein. As will be illustrated below, the single on-screen user interface may be presented by a communication device (e.g., a mobile phone or tablet computer). The communication device may be configured to engage in communication sessions of various session types with one or more other communication devices. For example, the communication device may be configured to engage with other communication devices in communication sessions including voice calls, video calls, group calls, text messaging exchanges, multimedia messaging exchanges, group messaging exchanges, and/or other session types. In some examples, the communication device may be engaged in a plurality of communication sessions (e.g., of the same session type or of different session types) concurrently.

In some embodiments, the communication session management system may concurrently present a first session icon and a second session icon within the on-screen user interface presented by the communication device while the communication device is concurrently engaged in a first communication session and a second communication session. The first session icon may be representative of the first communication session and configured to visually indicate a session status of the first communication session. Similarly, the second session icon may be representative of the second communication session and configured to visually indicate a session status of the second communication session. The communication session management system may detect a user action performed by a user with respect to one or both of the session icons and, in response, may modify the session status of one or both of the communication sessions. Upon modifying the session status of a communication session, the communication session management system may graphically indicate the modification of the session status on the on-screen user interface.

Users are able to most fully take advantage of communication services, such as the ability to manage multiple concurrent communication sessions, when the services are managed with intuitive and logical user interfaces. By presenting a single on-screen user interface to manage multiple communication sessions, the methods and systems described herein may allow users to take advantage of features involving multiple communication sessions such as initiating communication sessions while other sessions are ongoing, merging communication sessions together into group sessions, switching between concurrent communication sessions, converting communication sessions from one session type to another, etc. The disclosed methods and systems may also provide various other benefits that will be made apparent herein.

Figure 1:
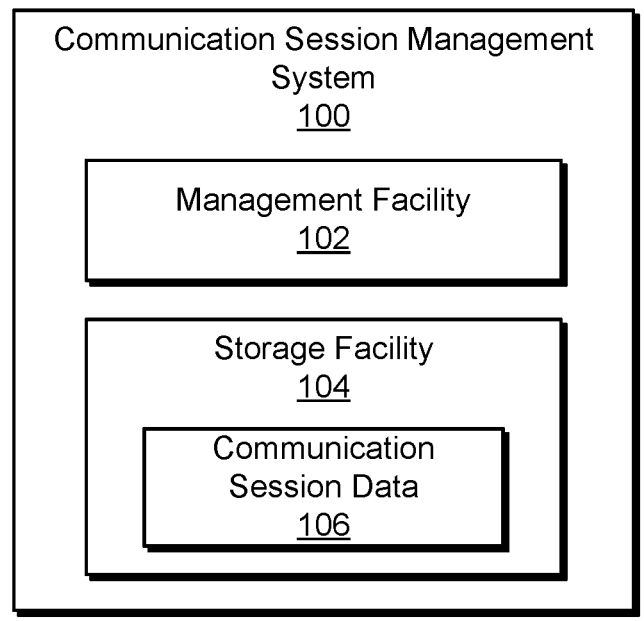
FIG. 1 illustrates an exemplary communication session management system configured to manage communication sessions conducted on a communication device according to principles described herein.

FIG. 1 illustrates an exemplary communication session management system 100 ("system 100") configured to manage communication sessions, including multiple concurrent communication sessions, conducted on a communication device. As shown, system 100 may include, without limitation, a management facility 102 and a storage facility 104 selectively and communicatively coupled to one another. It will be recognized that although facilities 102 and 104 are shown to be separate facilities in FIG. 1, any of the facilities 102 and 104 may be combined into fewer facilities, such as into a single facility, or divided into more facilities as may serve a particular implementation.

Storage facility 104 may maintain communication session data 106 generated and/or used by management facility 102. For example, as will be described below, communication session data 106 may include, but is not limited to, data representative of communication sessions such as session status information associated with communication sessions, data associated with an on-screen user interface presented by a communication device, data representative of detected user actions with respect to the on-screen user interface, etc. Storage facility 104 may maintain additional or alternative data as may serve a particular implementation.

Management facility 102 may perform one or more communication session management operations. For example, management facility 102 may facilitate the communication device in engaging in one or more concurrent communication sessions and may present information representative of the communication sessions within an on-screen user interface presented on the communication device. In particular, management facility 102 may concurrently present a plurality of session icons representative of the communication sessions and/or the respective session status of each communication session within the user interface. A session status may include any information related to a communication session that serves a particular implementation. For example, various elements of a session status may include information related to a session type of a communication session (e.g., voice call, video call, group call, text messaging exchange, multimedia messaging exchange, group messaging exchange, etc.), information related to whether the communication session is active (i.e. currently ongoing) or non-active, information related to why a communication session is non-active (e.g., a call is incoming or pending and has not yet been accepted, a call is on hold or parked, a messaging exchange is waiting for a response, etc.), and/or any other suitable information related to the status of the communication session. Thus, management facility 102 may present session icons indicative of each of the communication sessions and their respective session statuses in any suitable way. Various examples of session icons representing session statuses of communication sessions will be described and illustrated below.

Management facility 102 may further detect a user action performed by a user of the communication device with respect to one of the session icons presented on the user interface. For example, in embodiments where the user interface is presented on a point-and-click user interface (e.g., on a traditional desktop or notebook computer), management facility 102 may detect a user action such as that the user clicks or drags and drops one of the session icons with a pointing tool (e.g., mouse, trackpad, etc.). Similarly, in certain embodiments, the on-screen user interface may be a touchscreen interface (e.g., on a smartphone device, tablet device, personal computer with a touchscreen, etc.), and the user action performed by the user may be a user touch gesture performed with respect to a position within the touchscreen interface at which the session icon is presented.

Accordingly, in various examples, the user may perform a tap gesture, a double tap gesture, a pinch gesture, a press gesture, a spread gesture, a flick gesture, a drag-and-drop gesture, a swipe gesture, a rotate gesture, another touch gesture, or other suitable user gesture for a non-touchscreen user interface, with respect to the session icon presented within the touchscreen interface or other on-screen user interface. Exemplary manners in which management facility 102 may detect the user action will be described below.

In response to detecting the user action, management facility 102 may modify the session status of one or more communication sessions based on the user action. For example, management facility 102 may modify whether the communication session is active or non-active, whether the communication session is a separate communication session (i.e., a stand-alone session) or is merged with another communication session to form a group session, and/or the session type of the communication session. Additionally, management facility 102 may modify the session status of the one or more communication sessions in any other suitable way. Various modifications of session statuses will be described below in more detail.

Based on the modification of the session status of the communication session, management facility 102 may graphically indicate within the on-screen user interface the modification of the session status. For example, management facility 102 may modify the appearance (e.g., color, design, etc.) of the session icon corresponding to the modified communication session, merge session icons with one another, discontinue the presentation of one or more session icons, etc. Modifications to session icons responsive to modifications of communication session status will be described in more detail below.

Figure 2:
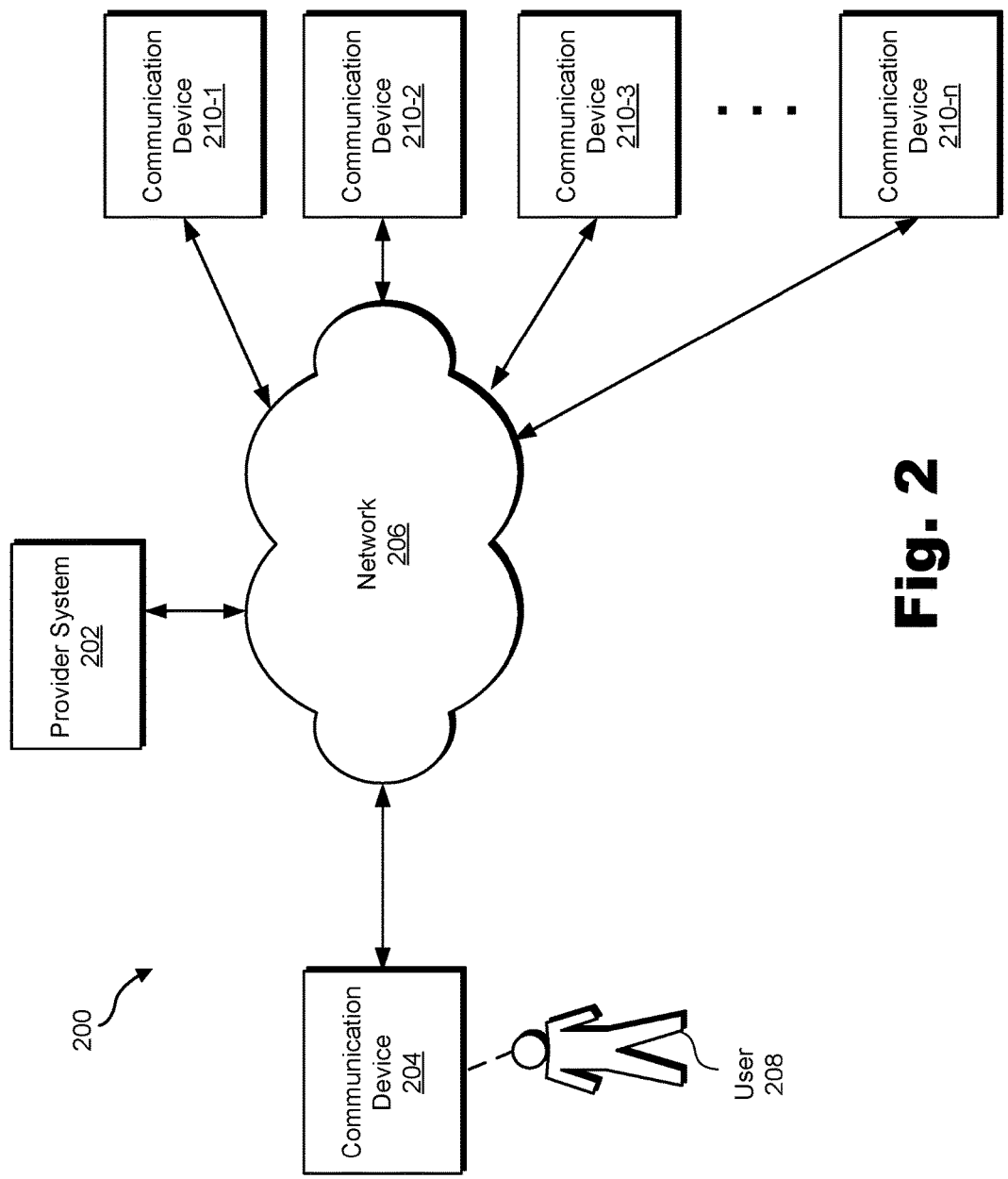
FIG. 2 illustrates an exemplary configuration that implements an exemplary communication session management system according to principles described herein.

FIG. 2 illustrates an exemplary configuration 200 that implements system 100. As shown, configuration 200 may include a provider system 202, a communication device 204 (e.g., a smartphone, a tablet device, etc.), and one or more additional communication devices 210 (e.g., communication devices 210-1 to 210-n) all communicatively coupled through a network 206. As illustrated, communication device 204 may be associated with a user 208. It is noted that communication devices 210 may also be associated with respective users (not shown). Each of these elements will now be described in detail.

Communication device 204 may be configured to facilitate one or more communication sessions that user 208 wishes to conduct using communication device 204. To this end, as will be described below, communication device 204 may engage in communication sessions with one or more of communication devices 210 by way of network 206. Communication device 204 and communication devices 210 may each include or be implemented by any suitable communication device such as a mobile or wireless device (e.g., a smartphone and/or a tablet device), a telephone or telephonic system, a personal computer, a set-top box device, a personal digital assistant device, a gaming device, a television device, and/or any other suitable communication device configured to engage in communication sessions (e.g., voice calls, video calls, group calls, text messaging exchanges, multimedia messaging exchanges, group messaging exchanges, etc.) with other communication devices. A communication device that implements the teachings described herein (e.g., communication device 204) may engage in communication sessions with other communication devices (e.g., communication devices 210) whether or not the other communication devices implement the teachings described herein.

Provider system 202 may be associated with (e.g., provided and/or managed by) a communication service provider (e.g., a network service provider, an application service provider, etc.) and may be configured to provide one or more communication services (e.g., voice, video, and messaging communication services, etc.) to communication device 204 and/or to communication devices 210. For example, provider system 202 may manage (e.g., connect, disconnect, track, allow, disallow, etc.) communication sessions between communication devices, such as between communication device 204 and communication devices 210. To this end, in certain embodiments, provider system 202 may direct or facilitate one or more communication devices in presenting on-screen user interfaces representative of communication sessions in which the communication devices are engaged. For example, provider system 202 may provide an application that may be executed by communication device 204 and that may direct communication device 204 to present a user interface and/or perform any of the communication session management operations described herein.

In other embodiments, communication devices (e.g., communication device 204 and/or one or more of communication devices 210) may manage their own respective communication sessions and/or on-screen user interfaces with little or no direction from provider system 202. For example, communication device 204 may be configured to manage the communication sessions in which communication device 204 is engaged and/or to present a user interface independently to allow user 208 to initiate and engage in communication sessions.

Accordingly, in some examples, system 100 is entirely implemented by communication device 204, while in other examples, system 100 may be entirely implemented by provider system 202. In yet other examples, system 100 may be implemented by a combination of communication device 204 and provider system 202.

In some examples, provider system 202 may manage (e.g., track, allow, disallow, route, etc.) network traffic (i.e., data) that flows through network 206. To this end, provider system 202 may be implemented by one or more gateways, routers, servers (e.g., domain name system ("DNS") servers and/or billing management servers), and/or other network components as may serve a particular implementation.

Communication device 204, provider system 202, and communication devices 210 may communicate with one another using any suitable communication technologies, devices, media, and protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

As shown, communication device 204, provider system 202, and communication devices 210 may communicate by way of network 206. Network 206 may include any provider-specific network (e.g., a wireless carrier network or a mobile telephone network), the Internet, or any other suitable network. Data may flow between communication device 204, provider system 202, and communication devices 210 using any suitable communication technologies, devices, media, and protocols as may serve a particular implementation.

While only one network 206 is shown in FIG. 2, it will be recognized that communication device 204 may communicate with provider system 202 and/or communication devices 210 by way of multiple interconnected networks in accordance with the methods and systems described herein as may serve a particular implementation.

System 100 (e.g., as implemented in configuration 200) may facilitate the management of multiple communication sessions in various ways. As such, exemplary manners by which system 100 may allow a user (e.g., user 208) to manage communication sessions from a single on-screen user interface presented on a communication device (e.g., communication device 204) will now be described.

Figure 3:
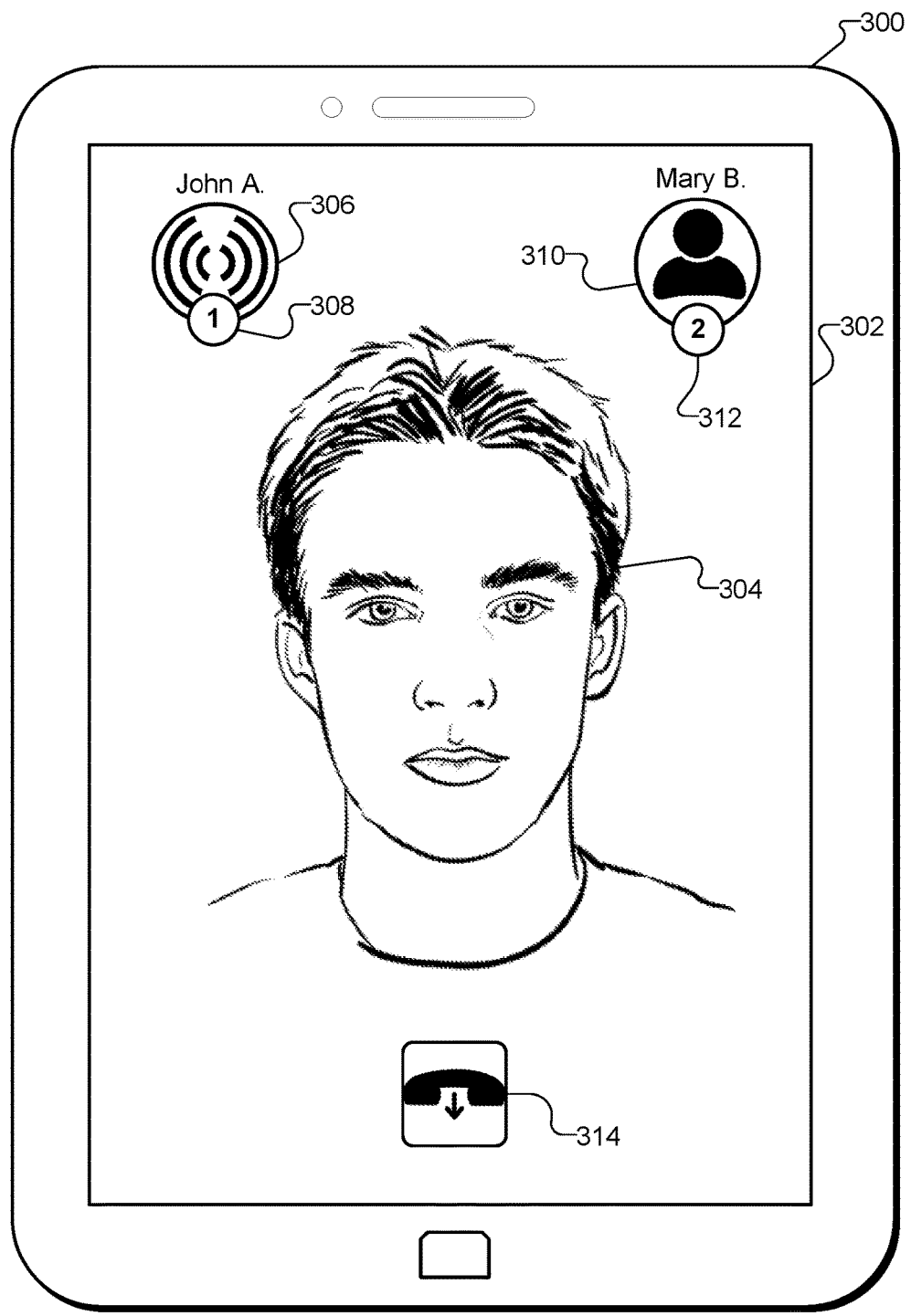
FIG. 3 shows an exemplary communication device on which an exemplary on-screen user interface is presented according to principles described herein.

FIG. 3 shows an exemplary communication device 300 on which an exemplary on-screen user interface 302 is presented. User interface 302 may be configured to allow the user to manage one or more communication sessions in which communication device 300 is concurrently engaged. To this end, user interface 302 may include a background 304, a first session icon 306 associated with a first session number 308, a second session icon 310 associated with a second session number 312, and one or more session controls 314. Each of these elements will now be described in detail.

Background 304 may be presented as a background of user interface 302 upon which other elements of user interface 302 are arranged, as shown. Alternatively, background 304 may be presented by itself in a particular portion of user interface 302 (not shown). Background 304 may be representative of a communication session such as a currently active communication session or a last communication session to be active. For example, as illustrated in FIG. 3, communication device 300 may be currently engaged in an active communication session with a person called "John A.," who may be associated with another communication device (e.g., communication device 210-1 illustrated in FIG. 2). As such, a picture of John A. may be included within background 304, as shown. Various other backgrounds, some of which are illustrated and described in more detail below, may be implemented to represent a currently on-hold communication session, a currently parked communication session, a group communication session, another type or status of communication session, etc.

User interface 302 may include one more session icons representative of communication sessions. As described above, each session icon may visually indicate the session status of the communication session represented by the session icon. For example, as illustrated in FIG. 3, session icon 306 represents a first communication session and indicates the session status of the first communication session (e.g., that the first communication session is an active call with John A.). Similarly, session icon 310 represents a second communication session and indicates the session status of the second communication session (e.g., that the second communication session is a non-active communication with a person called "Mary B.").

Session icons may indicate a session status of a communication session by color, appearance, design, blinking patterns, sounds, numbers, or by any other suitable indicators. For example, session icon 306 may indicate various elements of the session status of the communication session with John A. such as that the communication session is an active, separate, voice call. More specifically, session icon 306 may convey a particular color (e.g., green) to indicate that the communication session is active, a particular symbol to indicate that the communication session is a separate voice call rather than a group call or video call, and/or other information about the session status of the communication session. As shown, session number 308 is also associated with session icon 306 to indicate that the communication session with John A. is the first in a plurality of concurrent communication sessions being conducted on communication device 300. As will be described in more detail below, communication device 300 may support a limited number of concurrent communication sessions and/or a limited number of other communication devices with which communication device 300 may communicate with concurrently.

As shown, user interface 302 also includes exemplary session icon 310, which is representative of a non-active communication session with a person called "Mary B.," who may be associated with yet another communication device (e.g., communication device 210-2 illustrated in FIG. 2). Because the communication session with Mary B. is non-active (e.g., an incoming call, an on-hold call, etc.), background 304 may not include a picture of Mary B. However, session icon 310 may indicate various elements of the session status of the communication session with Mary B., such as that the communication session is a non-active, separate, voice call. For example, while background 304 may include the picture of John A. and session icon 306 may include a symbol indicative of an active call, session icon 310 may include a picture of Mary B. in place of the active call icon to indicate that the session status of the communication session with Mary B. is non-active and is associated with Mary B. separately, rather than with a group. Moreover, session icon 310 may convey other information about the session status by conveying a different color (e.g., red if the session status is on-hold, yellow if the session status is an incoming call, etc.), an additional icon (e.g., a video icon to indicate a video call rather than a voice call), or any other suitable indication of information related to the session status of the communication session. As shown, session number 312 is also associated with session icon 310 to indicate that the communication session with Mary B. is the second of a plurality of concurrent communication sessions being conducted by communication device 300.

User interface 302 may also include one or more dedicated session controls that may be associated with a particular communication session and/or with a currently active communication session. For example, session control 314 illustrated in FIG. 3 may be selected (e.g., clicked or tapped) by the user to terminate a currently active communication session, such as the communication session with John A. shown in the example of FIG. 3. While not illustrated in FIG. 3, other session controls may be employed by user interface 302 to allow the user, for example, to control the volume of a communication session, to mute a communication session (e.g., stop sharing audio and/or video information), to activate speaker mode, to present a dialing keypad (e.g., with which to enter touch-tone information), to put an active communication session on hold, to park an active communication session, to transfer an active communication session, to initiate a new and/or additional communication session, to switch the camera actively being used by a video communication session, to switch from one type of communication to another (e.g., from a voice call to a video call, from a voice call to a messaging exchange, etc.), to send a text message, to attach a file or a location to a multimedia message, etc.

In addition to managing communication sessions by use of session controls such as session control 314, the user may manage various aspects of the communication sessions in which communication device 300 is engaged by performing user actions with respect to session icons such as session icons 306 and 310. By performing such user actions, the user may cause the session status of one or more of the communication sessions to be modified.

Figure 4:
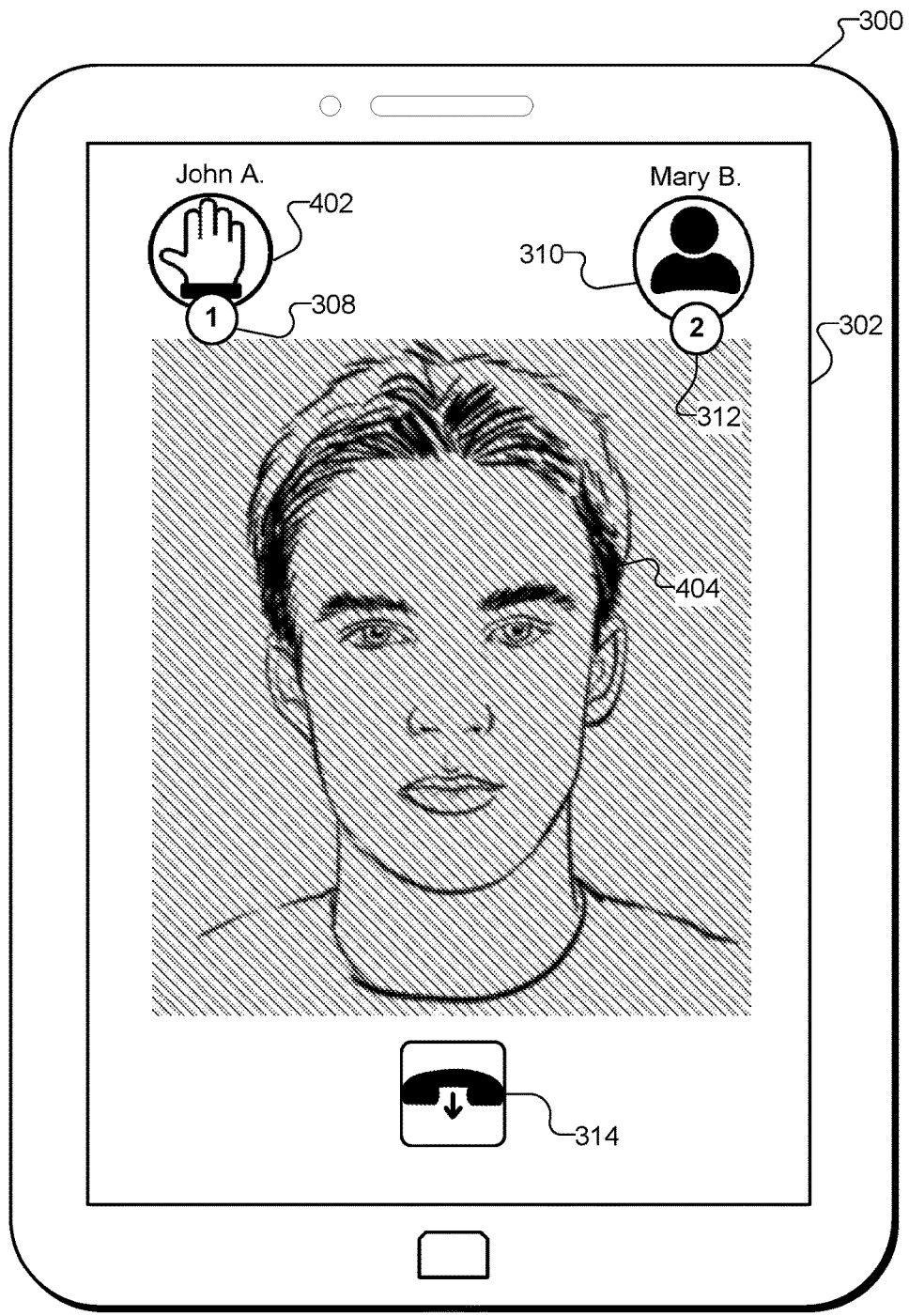
FIGS. 4-6 illustrate various exemplary modifications to session statuses of communication sessions represented within an exemplary on-screen user interface presented on an exemplary communication device according to principles described herein.

For example, FIG. 4 illustrates a modification to a session status of a communication session represented within on-screen user interface 302 presented on communication device 300. Specifically, as described above in relation to FIG. 3, communication device 300 may be engaged in a currently active communication session (e.g., communication session number 1) with another communication device (e.g., communication device 210-1 of FIG. 2) associated with another user (e.g., John A.). The user of communication device 300 may perform a user action to toggle the communication session with John A. between being an active call and being a non-active call. For example, the user may click or tap session icon 306 in FIG. 3 to put the communication session with John A. on hold. As another example, the user may right-click or tap and hold session icon 306 and select a menu item from a menu that is presented (not shown) to perform another user action with respect to the session status of the communication session (e.g., putting the communication session on hold, parking the communication session, transferring the communication session, merging the communication session with another communication session, etc.).

In response to detecting the user action performed by the user with respect to session icon 306 and modifying the session status of the communication session with John A., session icon 306 may be replaced with session icon 402 to graphically indicate the modification of the session status. For example, as shown in FIG. 4, session icon 402 may include a symbol indicative that the communication session has been put on hold or has otherwise been converted to a non-active communication session. Along with the graphical indication presented in session icon 402, background 304 may be replaced with background 404, which may include the picture of John A., but may be darkened or otherwise altered to indicate that the communication session with John A. is currently non-active.

In the example of FIG. 4, the user may perform another user action with respect to session icon 402 to re-activate the communication session with John A. For example, if the user taps or clicks session icon 402, the session status of the communication session with John A. may be modified from a non-active (e.g., on-hold) status back to an active status, allowing the communication session with John A. to continue. As such, this user action may cause user interface 302 to revert back to the way user interface 302 appeared in the example of FIG. 3.

Returning to FIG. 3, session icon 310 may be representative of user Mary B. using communication device 210-2 to initiate a communication session (e.g., a voice call) with the user of communication device 300, as described above. The communication session with Mary B. initiated by communication device 210-2 may be currently pending. For example, the communication session may be an incoming voice call that has not yet been accepted. Alternatively, the communication session with Mary B. may have already been accepted and may be on-hold, parked, or otherwise converted to a non-active status.

In some examples, the user of communication device 300 may wish to activate the communication session with Mary B. (e.g., by answering the voice call). For example, the user may see the indication of the incoming communication session with Mary B. represented by session icon 310 and wish to speak with her, or the user may have put the communication session with Mary B. on hold temporarily and may wish to return to it. Accordingly, the user of communication device 300 may perform a user action to convert the active communication session into a non-active communication session and to convert the incoming communication session into an active communication session. For example, the user may click or tap session icon 310 in FIG. 3 to put the current active voice call with John A. on hold and to activate (e.g., answer) the incoming voice call with Mary B. In other examples, the user may perform the modifications to the communication session in sequence (e.g., by first tapping session icon 306 to put the voice call with John A. on hold and then by tapping session icon 310 to activate the incoming voice call with Mary B), or by using menus, by using other user touch gestures, or by using other suitable techniques.

Figure 5:
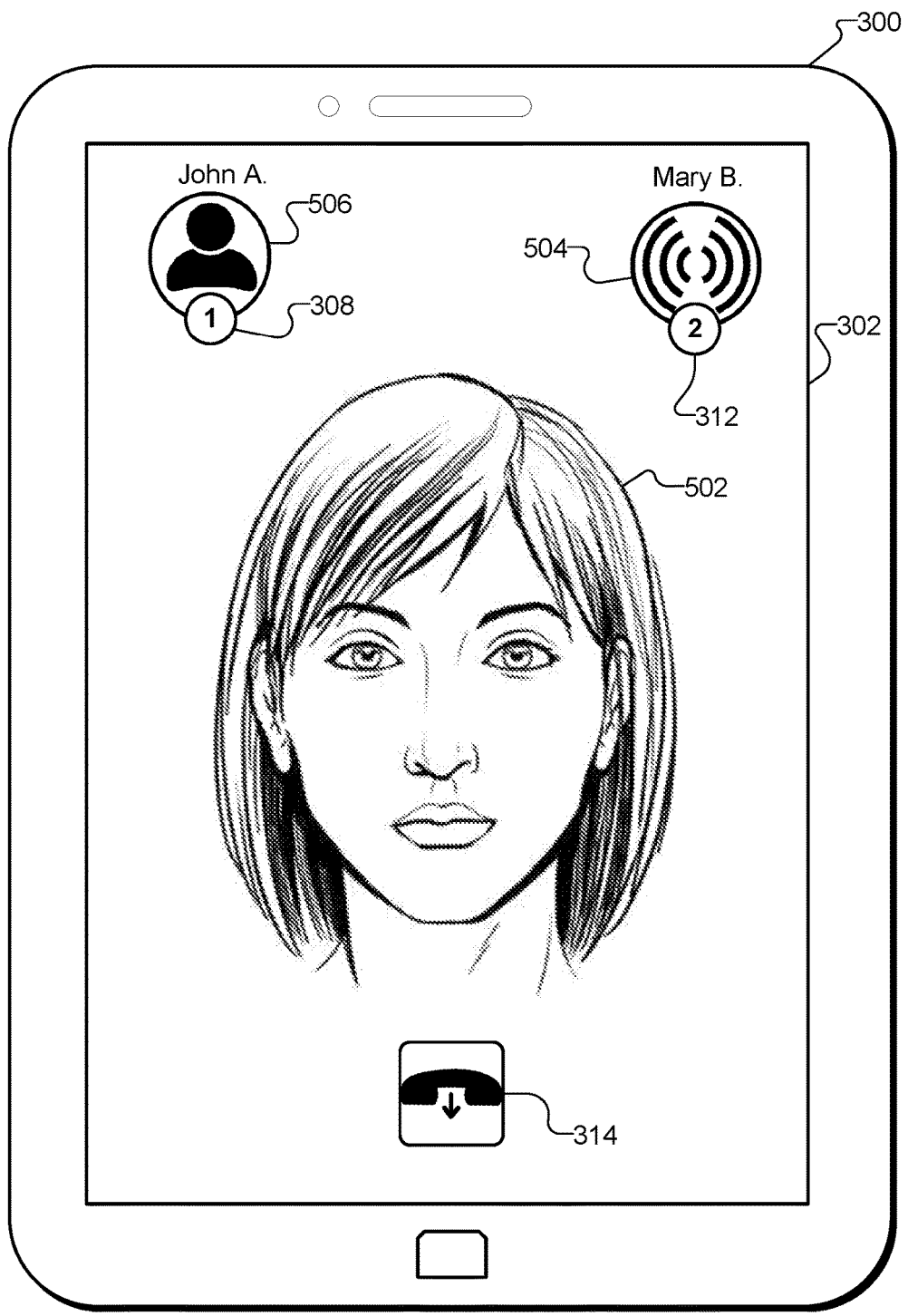

Accordingly, FIG. 5 illustrates the modification to the session statuses of the communication sessions represented within on-screen user interface 302 in response to the user action performed with respect to session icon 310 in FIG. 3. More particularly, FIG. 5 shows how the modification of the session statuses of the communication sessions with John A. (i.e. communication session number 1) and with Mary B. (i.e. communication session number 2) are graphically indicated within user interface 302. For example, FIG. 5 illustrates that background 304 of FIG. 3 depicting John A. may be replaced within user interface 302 by background 502 depicting Mary B. Likewise, session icon 310 of FIG. 3 may be replaced by session icon 504 to graphically indicate the modification of the session status of the communication session with Mary B. from non-active to active, while session icon 306 of FIG. 3 may be replaced by session icon 506 to graphically indicate the modification of the session status of the communication session with John A. from active to non-active. Thus, as shown in FIG. 5, session icon 504 may include a symbol indicative that the communication session is active and session icon 506 may include a different symbol or a picture of John A. to indicate that the communication session has been put on hold or otherwise been converted to a non-active communication session.

In the example of FIG. 5, the user may perform another user action with respect to session icons 504 and/or 506 to re-activate the communication session with John A. and to reconvert the communication session with Mary B. back to a non-active status. For example, if the user taps or clicks session icon 506, the session status of the communication session with John A. may be modified from a non-active (e.g., on-hold) status back to an active status, allowing the communication session with John A. to continue, while the session status of the communication session with Mary B. may be modified from an active status back to a non-active status (e.g., on-hold). As such, this user action may cause user interface 302 to revert back to the way user interface 302 appeared in the example of FIG. 3.

In the same or other examples, the user may wish to modify a session type of one or more communication sessions. Communication devices such as communication device 300 may support various communication session types including, without limitation, voice calls, video calls, group calls, text messaging exchanges, multimedia messaging exchanges (e.g., file exchanges), and group messaging exchanges. The session status of a communication session may include the session type of the communication session. For example, the session status of the active communication session with Mary B. may include the fact the communication session is a voice call. Thus, if the user wishes to convert the communication session to a video call, the user may perform a user action with respect to session icon 504 to invoke a modification of the session status with respect to the session type. For example, the user may perform a specific user touch gesture (e.g., a tap, double tap, pinch, press, spread, flick, drag and drop, swipe, rotate, or other touch gesture) or a different user action for a non-touch-screen interface to convert the video call into a voice call. Similarly, the same or another user touch gesture may convert the communication session from a voice call back to a video call, or from any type of call (e.g., voice call, video call, or group call) into a messaging exchange such as a text, multimedia, and/or group messaging exchange.

Moreover, the user may wish to convert a separate communication session such as a voice call or a video call with one individual into a group communication session with a plurality of individuals. Separate communication sessions (e.g., separate calls and/or separate messaging exchanges) may be combined into group communication sessions (e.g., group calls and/or group messaging exchanges) by merging the communication sessions. User interface 302 may facilitate session status modifications that include merging communication sessions with other communication sessions. Such merge modifications will now be described in detail.

Figure 6:
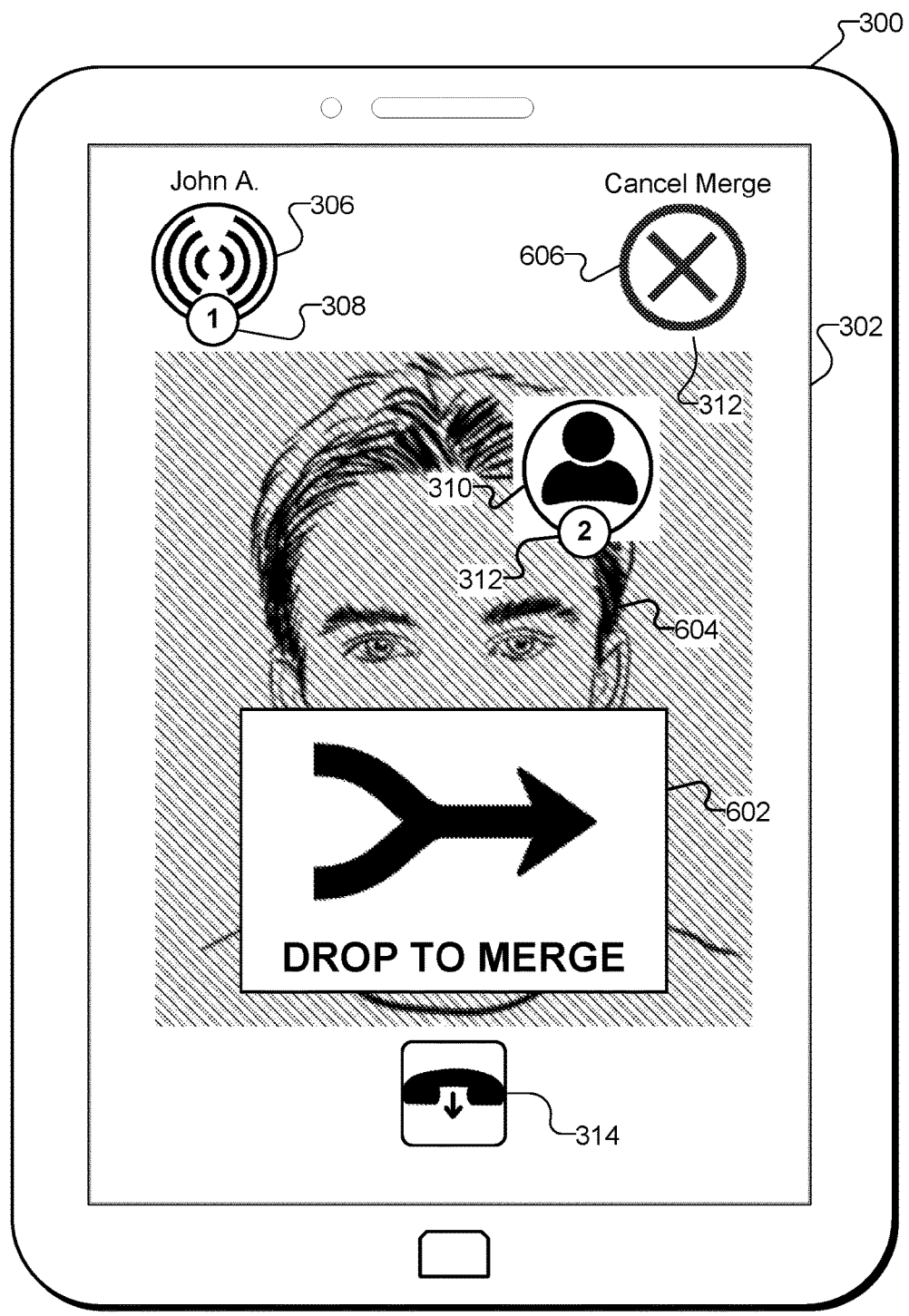

For example, FIG. 6 illustrates a merge modification to a session status of a communication session represented within on-screen user interface 302 presented on communication device 300. As in previous examples described above, the example of FIG. 6 may begin with communication device 300 concurrently engaged in a currently active communication session with another communication device (e.g., communication device 210-1 of FIG. 2) associated with another user (e.g., John A.) and in a non-active communication session with yet another communication device (e.g., communication device 210-2 of FIG. 2) associated with yet another user (e.g., Mary B.). For example, Mary B. may be using communication device 210-2 to initiate a communication session (e.g., a voice call) with the user of communication device 300 and the communication session with Mary B. may be currently pending (e.g., an incoming voice call that has not yet been accepted). As another example, the communication session may be a non-active voice call that has already been accepted and put on hold.

In some examples, the user of communication device 300 may wish to merge the communication session with Mary B. and the communication session with John A. into a group communication session (e.g., a group call or conference call). For example, the user may be speaking with John A. while waiting for Mary B. to call in for a conference call when the user sees the indication of the incoming communication session with Mary B. represented by session icon 310 in FIG. 3, or the user may be having concurrent individual conversations with both John A. and Mary B. and decide that the communication would be most effective as a single conversation with all three people.

Accordingly, the user of communication device 300 may perform a user action to merge the communication session with Mary B. and the communication session with John A. For example, as shown in FIG. 6, the user may perform a drag-and-drop gesture with respect to session icon 310 to physically drag session icon 310 from a first location (e.g., the upper corner where session icon 310 is positioned in FIG. 3) to a second location within the on-screen user interface (e.g., onto background 304 or session icon 306 of FIG. 3), and drop session icon 310 at the second location. The user may find this action to be a particularly intuitive method for merging the communication sessions with Mary B. and John A. because the user action may include dragging a picture of Mary B. (e.g., the picture included in session icon 310) onto a picture of John A. (e.g., the picture included in background 304) or onto an icon representative of John A. (e.g., session icon 306) and dropping the picture of Mary B. there.

As further illustrated in FIG. 6, various aspects of user interface 302 may change to facilitate the merge modification. For example, as shown, when the user is in the process of dragging session icon 310, an information popup 602 may appear indicating to the user that the user can drop session icon 310 at the current location of session icon 310 to merge the communication session represented by session icon 310 and the currently active communication session represented by background 304. Moreover, background 304 as illustrated in FIG. 3 may be replaced by background 604 as illustrated in FIG. 6 (e.g., by darkening or otherwise altering background 304) to indicate to the user that a valid drag-and-drop operation is being performed and to emphasize information popup 602. Moreover, as shown in FIG. 6, in the corner of user interface 302 where session icon 310 was previously positioned, a cancel merge icon 606 may be presented indicating that session icon 310 may be dragged back to the corner and dropped back into the first location where session icon 310 was positioned previously to cancel the merge modification of the communication sessions. In certain embodiments, another suitable user action such as another user gesture described herein may be performed instead of a drag-and-drop user action to trigger the merge modification.

In response to a detection of the user action (e.g., the drag-and-drop of session icon 310 onto background 604), the session type included within the session status of both communication sessions (e.g., with Mary B. and John A.) may be modified by merging the communication sessions. Specifically, the session status of both communication sessions may be modified from being separate voice calls to become a single group voice call.

Figure 7:
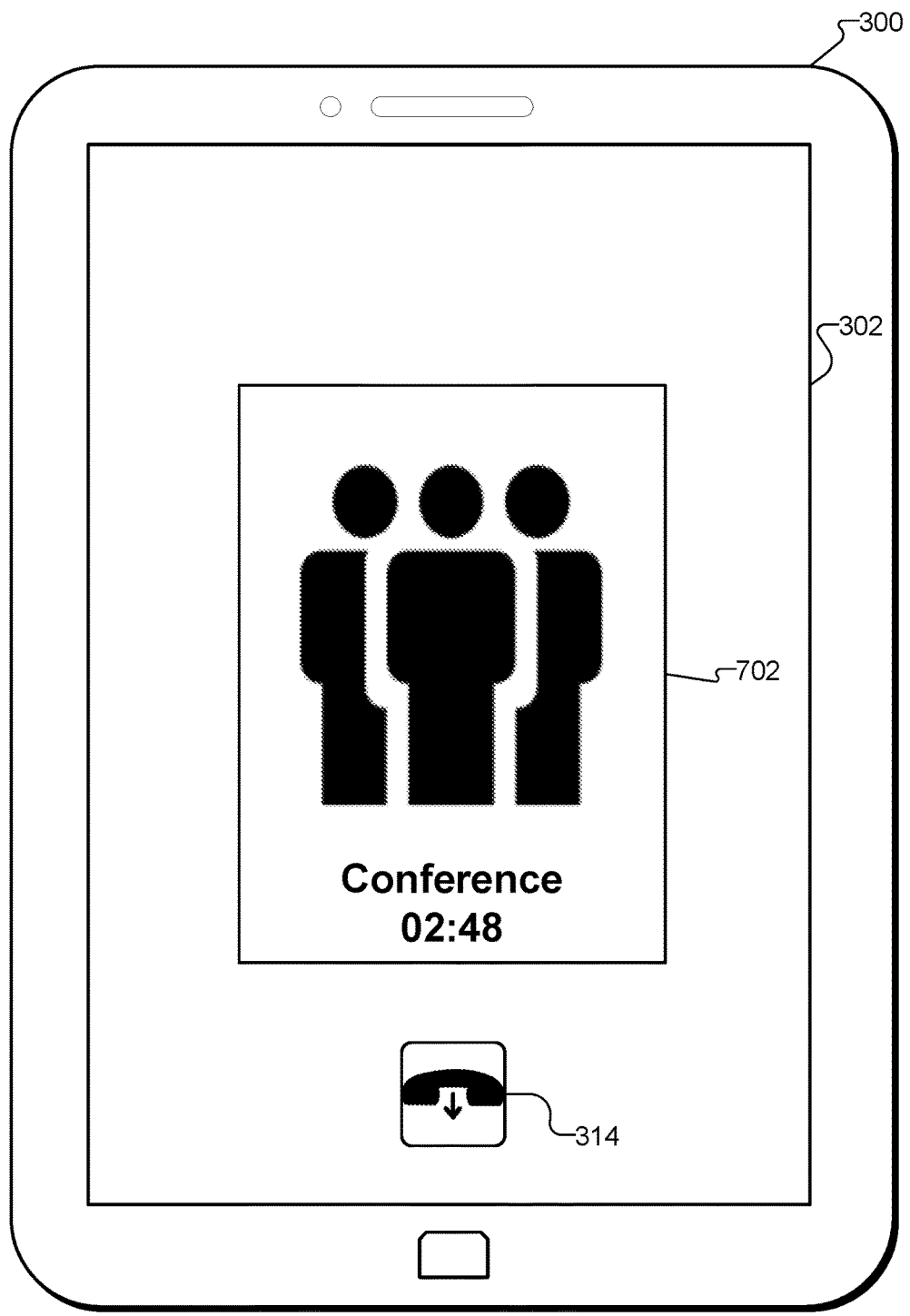
FIG. 7 illustrates an exemplary graphical indication of a modification to a session status of a communication session represented within an exemplary on-screen user interface presented on an exemplary communication device according to principles described herein.

The modification of the session status of the communication sessions may be graphically indicated within user interface 302. For example, FIG. 7 illustrates a graphical indication of the merge modification to the session statuses of the communication sessions represented within user interface 302 presented on communication device 300. Specifically, as illustrated in FIG. 7, the merge modification may be graphically indicated by discontinuing the presentation of both session icons (e.g., session icons 306 and 310) within user interface 302 such that no session icon is displayed. Because the merging of the communication sessions with Mary B. and with John A. result in communication device 300 only being engaged in a single communication session, user interface 302 may be configured to present a background representative of the single communication session but not present any session icon. Thus, as shown in FIG. 7, background 604 may be replaced by background 702. Background 702 indicates that communication device 300 is currently engaged in only a single active communication session, the session type of which is a group call. In other embodiments, session icons 306 and 310 may be merged into a single session icon (not shown) representative of the session status of the merged group call. In this case, the single session icon representing the merged group call may continue to be presented (e.g., along with background 702). An example of a merged group call session icon will be presented below.

In certain examples, a communication device may engage in more than two concurrent communication sessions. For example, a communication device may have an upper limit of communication sessions (e.g., five communication sessions) that may be conducted concurrently. The upper limit may be dependent on the session types of the concurrent communication sessions. For example, a communication device may be capable of conducting an unlimited number of messaging exchange communication sessions concurrently while conducting voice or video call communication sessions with only up to five other devices. Thus, in this example, up to five separate communication sessions may be merged into one or more group communication sessions, but the communication device would not be able to engage in additional voice or video call communication sessions with another communication device until one of the five separate communication sessions or group communication sessions is terminated. In various examples, the upper limit of concurrent communication sessions may be higher or lower than five, or an unlimited number of communication sessions may be supported.

Figure 8:
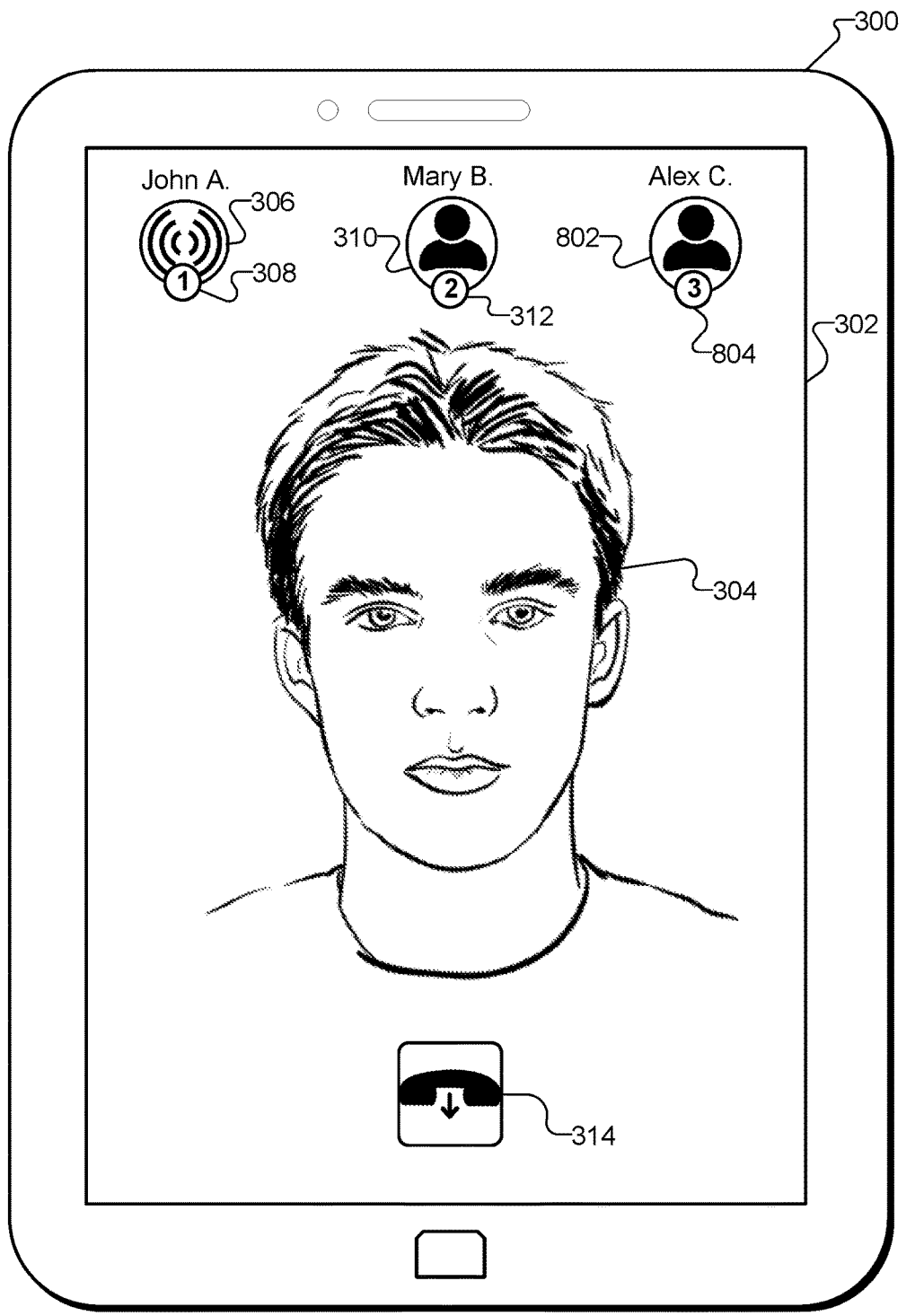
FIG. 8 shows an exemplary communication device on which an exemplary on-screen user interface is presented according to principles described herein.

In the same or other examples, a user interface of a communication device may allow the user to easily merge selected separate communication sessions into one or more group communication sessions while leaving other communication sessions as separate communication sessions. To illustrate, FIG. 8 shows user interface 302 presented by communication device 300 while communication device 300 is concurrently engaged in three separate communication sessions. As shown, user interface 302 includes many of the elements illustrated in previous examples (e.g., examples associated with FIG. 3). For example, FIG. 8 shows background 304, which includes a picture of John A. representative of an ongoing active communication session with John A., session icon 306 and associated session number 308, which represent the active communication session with John A. (e.g., communication session number 1), and session icon 310 and associated session number 312, which represent a non-active communication session with Mary B. (e.g., communication session number 2).

Additionally, as illustrated within user interface 302, a session icon 802 and associated session number 804 represent a third concurrent communication session with a person called "Alex C." in which communication device 300 is engaged. Alex C. may be a user associated with yet another communication device communicatively coupled with communication device 300 (e.g., communication device 210-3 in FIG. 2). As shown, session icon 802 may include a picture of Alex C., which may indicate that the session status of the communication session with Alex C. is currently non-active (e.g., pending, on-hold, etc.). As described above with respect to session icons 306 and 310, session icon 802 may also include other elements (e.g., color, etc.) indicative of the session status of the communication session with Alex C.

Figure 9:
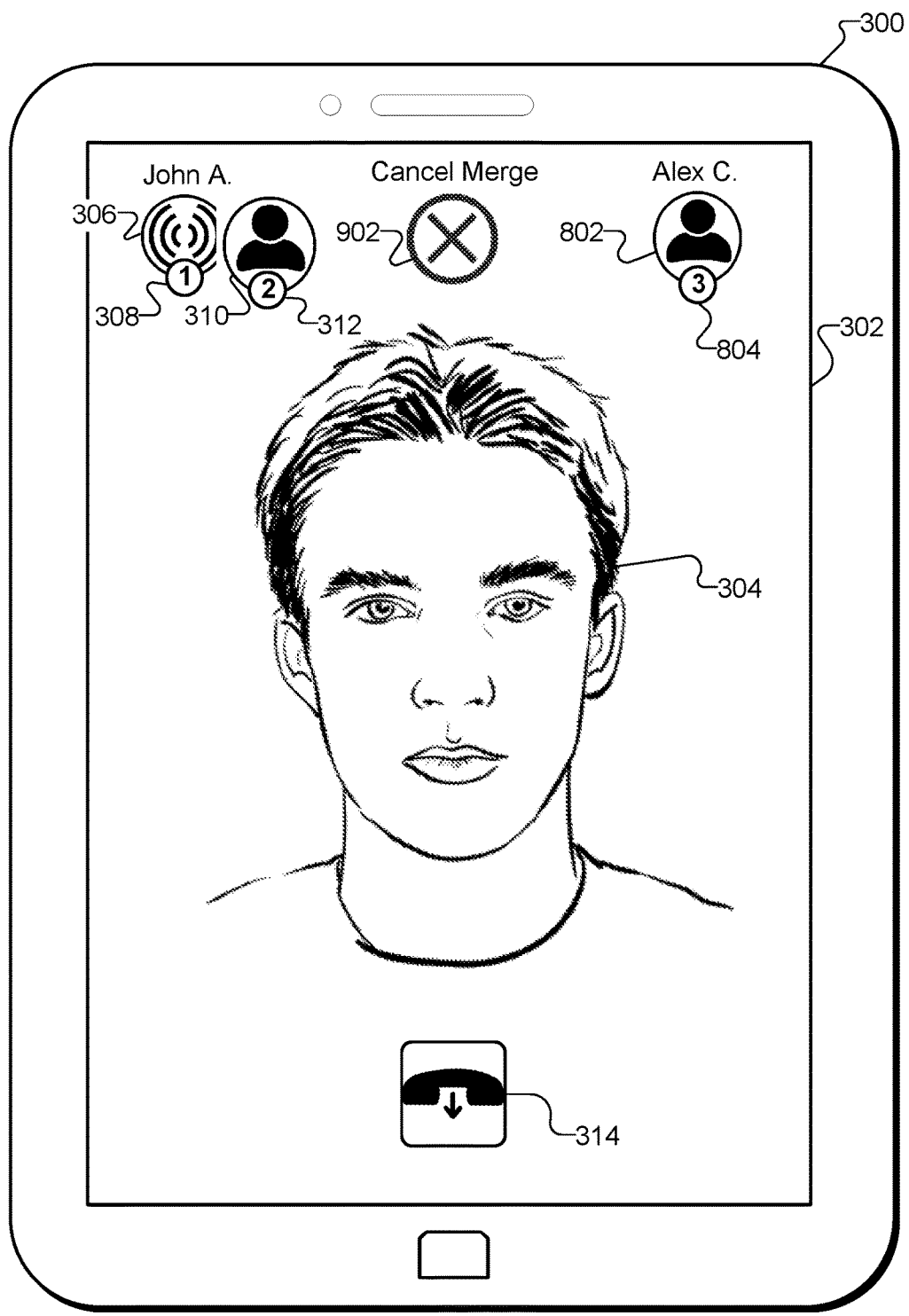
FIG. 9 illustrates an exemplary modification to a session status of a communication session represented within an exemplary on-screen user interface presented on an exemplary communication device according to principles described herein.

FIG. 9 illustrates a merge modification to a session status of a communication session represented within on-screen user interface 302 presented on communication device 300. More particularly, FIG. 9 illustrates a merge modification of a session status of the concurrent communication sessions with John A. and Mary B. while the session status of the concurrent communication session with Alex C. remains substantially unaffected.

As shown, the user of communication device 300 may wish to merge the communication session with Mary B. and the communication session with John A. into a group communication session (e.g., a group call or conference call). However, the user may wish to maintain the non-active session status of the communication session with Alex C. For example, the user may be planning a conference call with John A. and Mary B. who are business associates of the user (e.g., co-members of a sales team), and with Alex C., who is a client of the user and his or her business associates (e.g., a potential customer to whom the user, John A., and Mary B. are planning to make a sales pitch). Thus, once the user has established concurrent separate communication sessions with all three people, the user may wish to first merge the communication sessions with John A. and Mary B. (e.g., to briefly converse with them to ensure that they are prepared to conduct the sales pitch) before later merging in the communication session with Alex C.

Accordingly, the user of communication device 300 may perform a user action to merge the communication session with Mary B. and the communication session with John A, but which does not merge the communication session with Alex C. For example, the user may perform a drag-and-drop gesture with respect to session icon 310 to physically drag session icon 310 from a first location to a second location within the on-screen user interface. For example, the first location may be the upper center of user interface 302 where session icon 310 is positioned in FIG. 8, and the second location may be a location within a predetermined vicinity of session icon 306 (e.g., right on top of session icon 306, overlapping with session icon 306, within a certain radius around session icon 306, etc.). Alternatively, since the communication session with John A. is the currently active communication session represented by background 304, the second location at which session icon 310 is dropped may be a location associated with the representation of the communication session with John A., such as a location associated with background 304 as illustrated and discussed above in relation to FIG. 6.

As in the example of FIG. 6, various aspects of user interface 302 may change to facilitate the merge modification of FIG. 9. For example, as shown in FIG. 9, in the first position where session icon 310 was previously positioned (e.g., the upper center of user interface 302), a cancel merge icon 902 may be presented indicating that session icon 310 may be dragged back to the upper center and dropped back into the first location to cancel the merge modification of the communication sessions. Moreover, in certain embodiments, additional aspects of user interface 302 may change to further facilitate the merge modification of the session status of the communication sessions. For example, as illustrated and discussed above in relation to FIG. 6, an information popup (not shown in FIG. 9) may appear indicating to the user that the user can drop session icon 310 where session icon 310 is located to merge the communication sessions, and/or a modified background may be presented (not shown in FIG. 9). In certain embodiments, other suitable user actions such as other user gestures described herein may be performed instead of a drag-and-drop user action to trigger the merge modification.

In response to a detection of the user action (e.g., the drag-and-drop of session icon 310 into the predetermined vicinity of session icon 306), the session type included within the session statuses of the communication sessions with John A. and Mary B. (i.e. communication session numbers 1 and 2) may be modified by merging the communication sessions. Specifically, the session status of both communication sessions may be modified from being separate voice calls to become a single group voice call. However, the session status of the communication session with Alex C. (i.e. communication session number 3) may not be modified. Rather, the session type of the communication session with Alex C. may remain a separate voice call.

Figure 10:
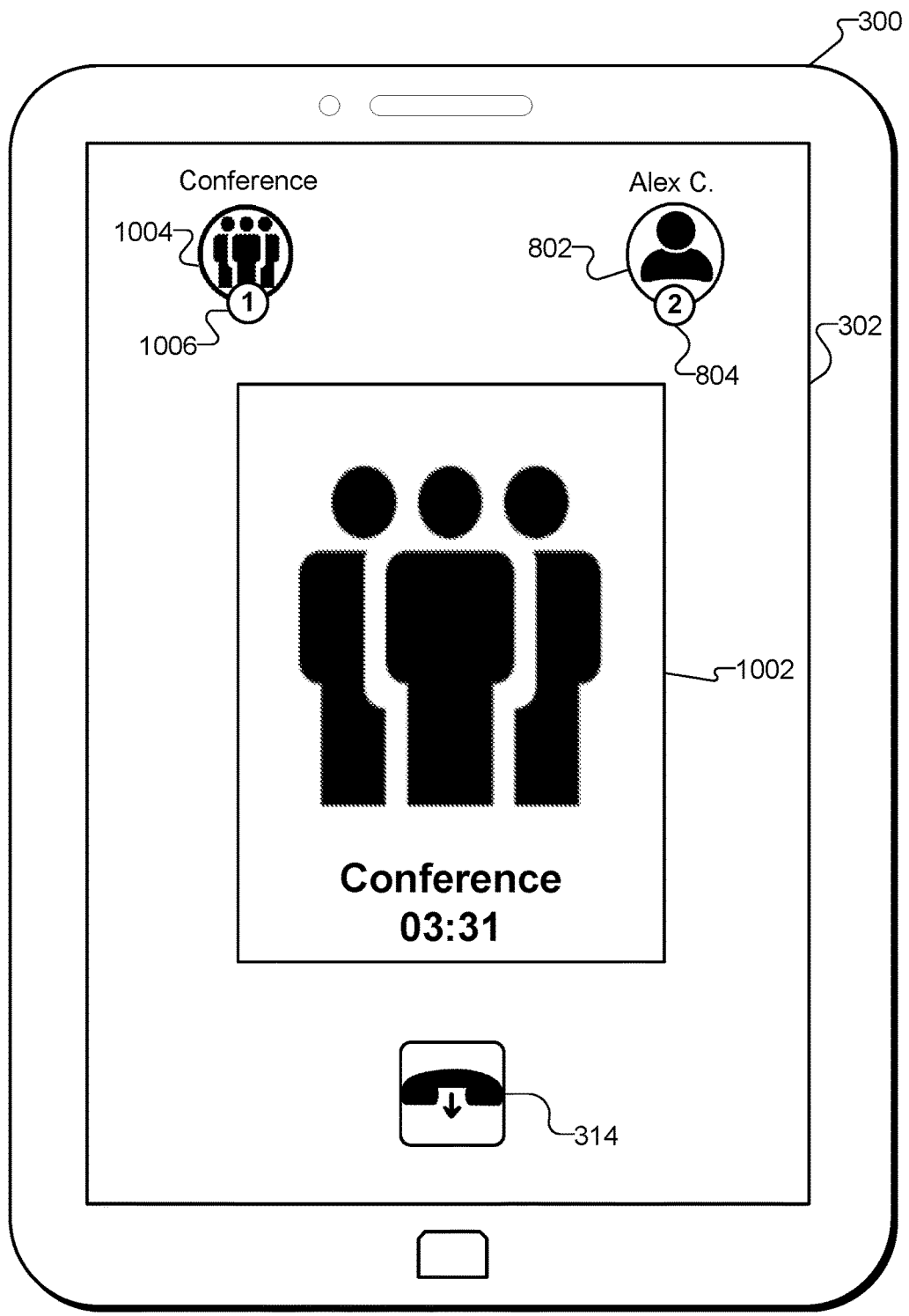
FIG. 10 illustrates an exemplary graphical indication of a modification to a session status of a communication session represented within an exemplary on-screen user interface presented on an exemplary communication device according to principles described herein.

The modification of the session status of the communication sessions with John A. and Mary B. may be graphically indicated within user interface 302. For example, FIG. 10 illustrates a graphical indication of the merge modification to the session status of the communication sessions represented within user interface 302 presented on communication device 300. Specifically, as illustrated in FIG. 10, the merge modification may be graphically indicated by combining session icon 310 with session icon 306 to present a single merged session icon 1004 within user interface 302. Additionally, because the merging of the communication sessions with Mary B. and with John A. result in communication device 300 only being engaged in two concurrent communication sessions (e.g., the group call with John A. and Mary B. and the separate voice call with Alex C.) rather than three communication sessions, the session numbers may also be affected (e.g., the communication sessions may be renumbered). For example, as shown in FIG. 10, session number 1006 indicates that the group communication session with John A. and Mary B. represented by session icon 1004 may be communication session number 1. Meanwhile, session number 804 indicates that the separate communication session with Alex C. represented by session icon 802 may now be communication session number 2, rather than communication session number 3, as was indicated by session number 804 in FIG. 8. Moreover, user interface 302 may be configured to present a background representative of the merged group communication session with John A. and Mary B. since the group communication session is currently active. Thus, as shown in FIG. 10, background 304 may be replaced by background 1002. Background 1002 indicates that communication device 300 is currently engaged in an active communication session, the session type of which is a group call.

Figure 11:
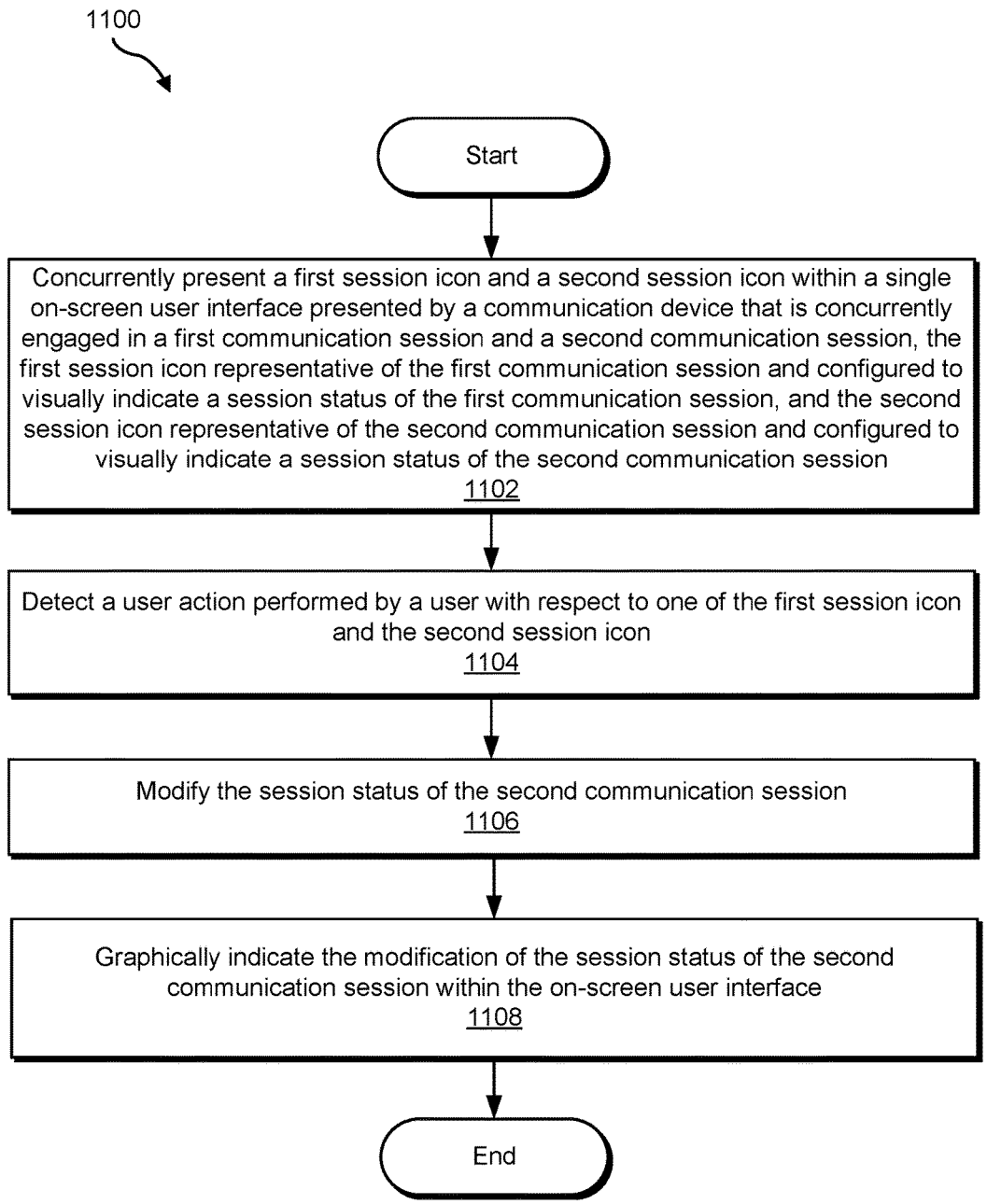
FIGS. 11-12 illustrate exemplary methods for managing multiple communication sessions from a single on-screen user interface according to principles described herein.

FIG. 11 illustrates an exemplary method 1100 of managing multiple communication sessions from a single on-screen user interface. While FIG. 11 illustrates exemplary operations according to one embodiment, other embodiments may omit, add to, reorder, and/or modify any of the operations shown in FIG. 11. One or more of the operations shown in FIG. 11 may be performed by system 100 and/or any implementation thereof.

In operation 1102, a communication session management system concurrently presents a first session icon and a second session icon within a single on-screen user interface presented by a communication device that is concurrently engaged in a first communication session and a second communication session, the first session icon representative of the first communication session and configured to visually indicate a session status of the first communication session, and the second session icon representative of the second communication session and configured to visually indicate a session status of the second communication session. Operation 1102 may be performed in any of the ways described herein.

In operation 1104, the communication session management system detects a user action performed by a user with respect to one of the first session icon and the second session icon. Operation 1104 may be performed in any of the ways described herein.

In operation 1106, the communication session management system modifies the session status of the second communication session. For example, the communication session management system may modify the session status of the second communication session in response to the user action. Operation 1106 may be performed in any of the ways described herein.

In operation 1108, the communication session management system graphically indicates the modification of the session status of the second communication session within the on-screen user interface. Operation 1108 may be performed in any of the ways described herein.

Figure 12:
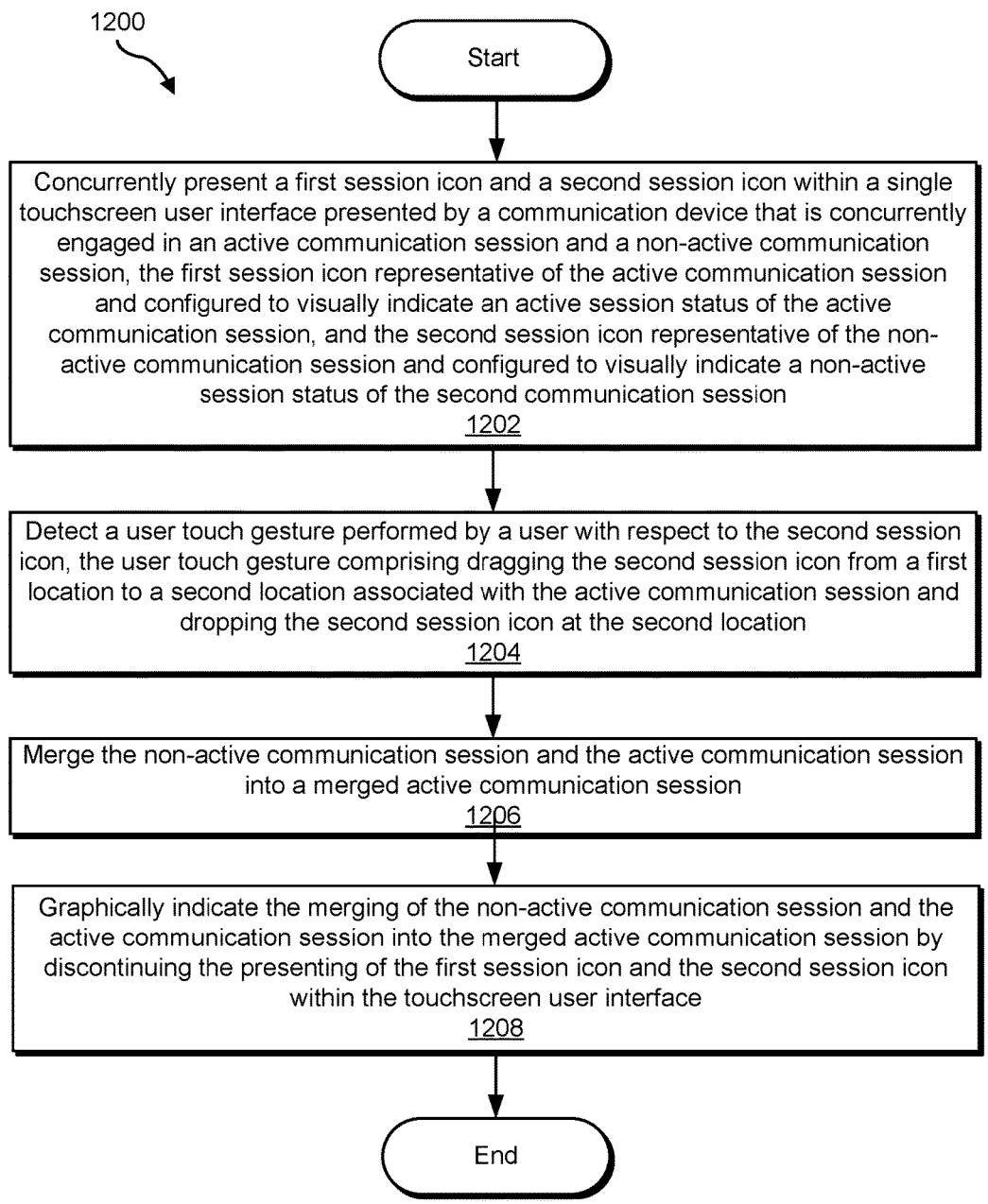

FIG. 12 illustrates an exemplary method 1200 of managing multiple communication sessions from a single on-screen user interface. While FIG. 12 illustrates exemplary operations according to one embodiment, other embodiments may omit, add to, reorder, and/or modify any of the operations shown in FIG. 12. One or more of the operations in FIG. 12 may be performed by system 100 and/or any implementation thereof.

In operation 1202, a communication session management system concurrently presents a first session icon and a second session icon within a single touchscreen user interface presented by a communication device that is concurrently engaged in an active communication session and a non-active communication session, the first session icon representative of the active communication session and configured to visually indicate an active session status of the active communication session, and the second session icon representative of the non-active communication session and configured to visually indicate a non-active session status of the second communication session. Operation 1202 may be performed in any of the ways described herein.

In operation 1204, the communication session management system detects a user touch gesture performed by a user with respect to the second session icon, the user touch gesture comprising dragging the second session icon from a first location to a second location associated with the active communication session and dropping the second session icon at the second location. Operation 1204 may be performed in any of the ways described herein.

In operation 1206, the communication session management system merges the non-active communication session and the active communication session into a merged active communication session. For example, the communication session management system may merge the non-active communication session and the active communication session into a merged active communication session in response to the user touch gesture. Operation 1206 may be performed in any of the ways described herein.

In operation 1208, the communication session management system graphically indicates the merging of the non-active communication session and the active communication session into the merged active communication session by discontinuing the presenting of the first session icon and the second session icon within the touchscreen user interface. Operation 1208 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 13:
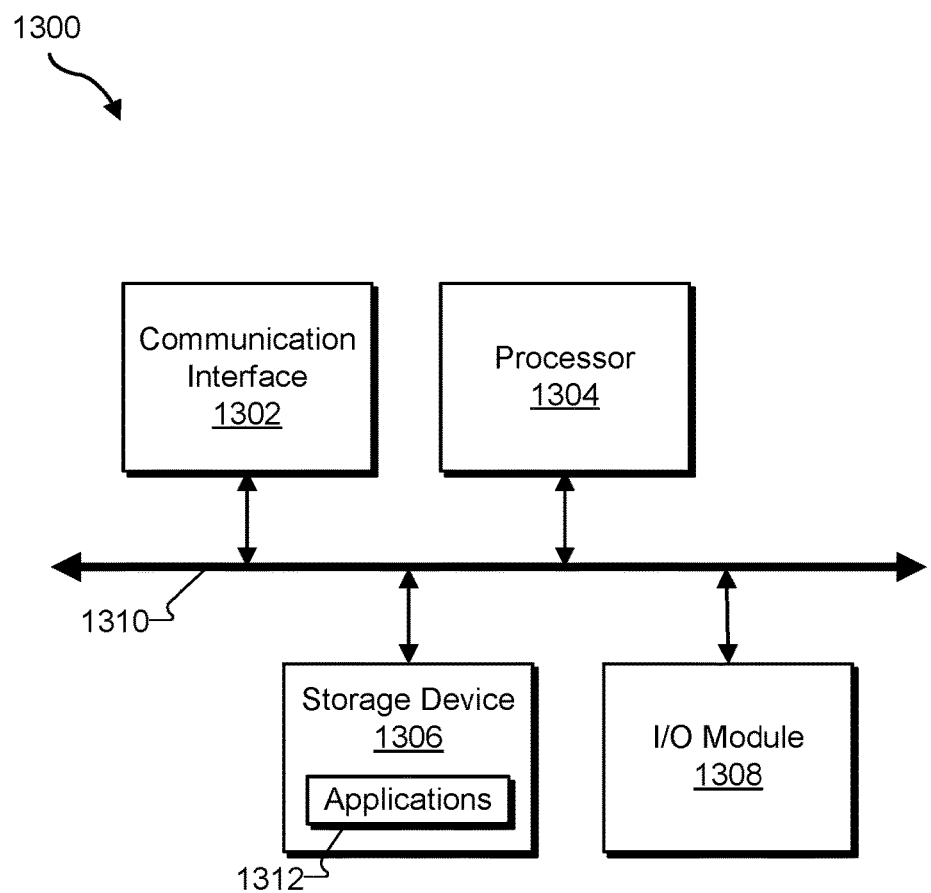
FIG. 13 illustrates an exemplary computing device according to principles described herein.

FIG. 13 illustrates an exemplary computing device 1300 that may be specifically configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1306. For example, data representative of one or more executable applications 1312 configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touchscreen component (e.g., touchscreen display), a receiver (e.g., an RF or infrared receiver), and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with management facility 102. Likewise, storage facility 104 may be implemented by or within storage device 1306.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   concurrently presenting, by a communication session management system, a first session icon and a second session icon within a single on-screen user interface presented by a communication device that is concurrently engaged in a first communication session and a second communication session, wherein
      the first session icon alone represents the first communication session and visually indicates a session status of the first communication session,
      the second session icon alone represents the second communication session and visually indicates a session status of the second communication session,
      one of the first and second communication sessions is a group communication session represented by a single merged session icon that has graphically replaced a third session icon and a fourth session icon that respectively represented a third communication session and a fourth communication session that were merged into the group communication session, the single merged session icon depicting a symbol that conveys a session type of the group communication session without conveying information regarding an identity of any particular person engaging in the group communication session, and
      at least one of the first and second session statuses is an active session status;
   detecting, by the communication session management system, a user action performed by a user with respect to one of the first session icon and the second session icon;
   modifying, by the communication session management system in response to the user action, the session status of the second communication session; and
   graphically indicating, by the communication session management system within the on-screen user interface, the modification of the session status of the second communication session.

2. The method of claim 1, wherein the on-screen user interface is a touchscreen interface and the user action performed by the user is a user touch gesture performed by the user with respect to a position within the touchscreen interface at which the second session icon is presented.

3. The method of claim 1, wherein the modifying of the session status of the second communication session comprises toggling the second communication session between being an active call and being a non-active call.

4. The method of claim 1, wherein the session status of the first communication session indicates that the first communication session is an active call and the session status of the second communication session indicates that the second communication session is a non-active call.

5. The method of claim 4, further comprising:
   modifying, by the communication session management system in response to the user action, the session status of the first communication session to convert the first communication session into a non-active call;

wherein the modifying of the session status of the second communication session comprises converting the second communication session into an active call.

6. The method of claim 1, wherein the graphically indicating comprises modifying an appearance of the second session icon.

7. The method of claim 1, wherein:
the detecting of the user action comprises detecting that the second session icon is dragged and dropped by the user to a position within the on-screen user interface that is within a predetermined vicinity of the first session icon;
the modifying of the session status of the second communication session comprises merging the second communication session and the first communication session into the group communication session; and
the graphically indicating of the modification of the session status comprises combining the second session icon and the first session icon into the single merged session icon.

8. The method of claim 1, wherein:
the detecting of the user action comprises detecting that the second session icon is dragged by the user from a first location within the on-screen user interface to a second location within the on-screen user interface and dropped at the second location;
the modifying of the session status of the second communication session comprises merging the second communication session and the first communication session into the group communication session; and
the graphically indicating of the modification of the session status comprises discontinuing the presentation of the first session icon and the second session icon within the on-screen user interface.

9. The method of claim 8, wherein:
a background of the on-screen user interface comprises a representation of the first communication session; and
the second location within the on-screen user interface is a location associated with the representation of the first communication session.

10. The method of claim 1, wherein:
the group communication session is the first communication session;
the session status of the second communication session comprises a second session type associated with the second communication session; and
the modification of the session status comprises changing the second session type associated with the second communication session.

11. The method of claim 10, wherein the changing of the second session type associated with the second communication session comprises toggling the second session type between a video call and a voice call.

12. The method of claim 1, embodied as computer-executable instructions on at least one non-transitory computer-readable medium.

13. A method comprising:
concurrently presenting, by a communication session management system, a first session icon and a second session icon within a single touchscreen user interface presented by a communication device that is concurrently engaged in an active communication session and a non-active communication session, wherein
the first session icon alone represents the active communication session and visually indicates an active session status of the active communication session,
the second session icon alone represents the non-active communication session and visually indicates a non-active session status of the second communication session, and
one of the active and non-active communication sessions is a group communication session represented by a single merged session icon that has graphically replaced a third session icon and a fourth session icon that respectively represented a third communication session and a fourth communication session that were merged into the group communication session, the single merged session icon depicting a symbol that conveys a session type of the group communication session without conveying information regarding an identity of any particular person engaging in the group communication session;
detecting, by the communication session management system, a user touch gesture performed by a user with respect to the second session icon, the user touch gesture comprising dragging the second session icon from a first location to a second location associated with the active communication session and dropping the second session icon at the second location;
merging, by the communication session management system in response to the user touch gesture, the non-active communication session and the active communication session into a merged active communication session; and
graphically indicating, by the communication session management system within the touchscreen user interface, the merging of the non-active communication session and the active communication session into the merged active communication session by discontinuing the presenting of the first session icon and the second session icon within the touchscreen user interface.

14. The method of claim 13, embodied as computer-executable instructions on at least one non-transitory computer-readable medium.

15. A system comprising:
at least one physical computing device that:
concurrently presents a first session icon and a second session icon within a single on-screen user interface presented by a communication device that is concurrently engaged in a first communication session and a second communication session, wherein
the first session icon alone represents the first communication session and visually indicates a session status of the first communication session,
the second session icon alone represents the second communication session and visually indicates a session status of the second communication session,
one of the first and second communication sessions is a group communication session represented by a single merged session icon that has graphically replaced a third session icon and a fourth session icon that respectively represented a third communication session and a fourth communication session that were merged into the group communication session, the single merged session icon depicting a symbol that conveys a session type of the group communication session without conveying information regarding an identity of any particular person engaging in the group communication session, and
at least one of the first and second session statuses is an active session status;

detects a user action performed by a user with respect to one of the first session icon and the second session icon;

modifies, in response to the user action, the session status of the second communication session; and graphically indicates the modification of the session status of the second communication session within the on-screen user interface.

16. The system of claim 15, wherein:

the session status of the first communication session indicates that the first communication session is an active call and the session status of the second communication session indicates that the second communication session is a non-active call;

the at least one physical computing device modifies the session status of the second communication session by converting the second communication session into an active call; and the at least one physical computing device further modifies the session status of the first communication session to convert the first communication session into a non-active call in response to the user action.

17. The system of claim 15, wherein:

the at least one physical computing device detects the user action by detecting that the second session icon is dragged and dropped by the user to a position within the on-screen user interface that is within a predetermined vicinity of the first session icon;

the at least one physical computing device modifies the session status of the second communication session by merging the second communication session and the first communication session into the group communication session; and the at least one physical computing device graphically indicates the modification of the session status by combining the second session icon and the first session icon into the single merged session icon.

18. The system of claim 15, wherein:

the at least one physical computing device detects the user action by detecting that the second session icon is dragged by the user from a first location to a second location within the on-screen user interface and dropped at the second location;

the at least one physical computing device modifies the session status of the second communication session by merging the second communication session and the first communication session into the group communication session; and the at least one physical computing device graphical indicates the modification of the session status by discontinuing the presentation of the first session icon and the second session icon within the on-screen user interface.

19. The system of claim 18, wherein:

a background of the on-screen user interface comprises a representation of the first communication session; and the second location within the on-screen user interface is a location associated with the representation of the first communication session.

20. The system of claim 15, wherein:

the group communication session is the first communication session;

the session status of the second communication session comprises a second session type associated with the second communication session; and the at least one physical computing device modifies the session status by changing the second session type associated with the second communication session.

* * * * *